Figure 1:
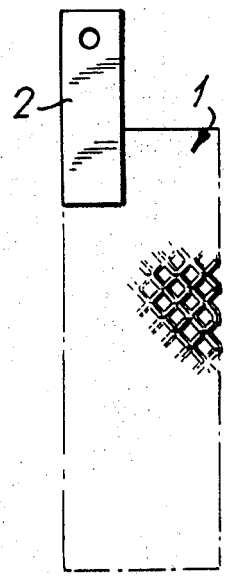

United States Patent

[11] 3,615,831

| | | | |
|---|---|---|---|
| [72] | Inventor | Samuel Ruben |
| | | 52 Seacord Road, New Rochelle, N.Y. 10801 |
| [21] | Appl. No. | 51,457 |
| [22] | Filed | July 1, 1970 |
| [23] | | Continuation-in-part of application Ser. No. 800,078, Feb. 18, 1969, abandoned |
| [45] | Patented | Oct. 26, 1971 |

[54] LEAD OXIDE-SULFURIC ACID BATTERY HAVING A POSITIVE ELECTRODE COMPRISING A TITANIUM-MOLYBDENUM-ZIRCONIUM ALLOY GRID
6 Claims, 5 Drawing Figs.

[52] U.S. Cl. .................................................. 136/26, 136/65
[51] Int. Cl. ....................................... H01m39/00

[50] Field of Search.......................................... 136/26–27, 19, 36, 65, 64, 6, 56, 76–78; 75/175.5, 176, 177

[56] References Cited
UNITED STATES PATENTS

| | | | |
|---|---|---|---|
| 2,614,041 | 10/1952 | Finlay........................... | 75/175.5 |
| 2,631,115 | 3/1953 | Fox ............................... | 136/138 |
| 2,856,446 | 10/1958 | McCallum................... | 136/26 |
| 3,060,255 | 10/1962 | Lozier........................... | 136/100 |

*Primary Examiner*—Anthony Skapars
*Attorney*—Leon Robbin

ABSTRACT: The invention is a lead-acid rechargeable cell in which the positive electrode comprises a base of a titanium-molybdenum-zirconium alloy having a surface film of a nonpolarizing element, such as gold, and an active lead oxide coating over said nonpolarizing surface.

PATENTED OCT 26 1971    3,615,831

INVENTOR
SAMUEL RUBEN

BY

ATTORNEY

LEAD OXIDE-SULFURIC ACID BATTERY HAVING A POSITIVE ELECTRODE COMPRISING A TITANIUM-MOLYBDENUM-ZIRCONIUM ALLOY GRID

This application is a continuation-in-part of my copending application Ser. No. 800,078 filed Feb. 18, 1969, now abandoned, entitled, "Electric Current Producing Cell".

The invention relates to lightweight positive electrodes for lead-sulfuric acid batteries. Storage batteries employing the electrode have a higher output per pound than conventional lead-acid storage batteries. In the present invention, a titanium alloy replaces lead as the supporting member for the active lead peroxide. A nonpolarizing film of gold or other suitable material is interposed between the titanium alloy and the oxide. The titanium alloy which has given the best corrosion resistance as a lightweight grid is one composed of a beta type titanium-molybdenum composition containing a small amount of zirconium, a preferred composition having a metastable beta structure comprising titanium 80 percent, molybdenum 15 percent, and zirconium 5 percent. Prior to the application of the nonpolarizing film, the titanium alloy may be nitrided.

The invention of this application is related to that disclosed in my copending application Ser. No. 868,133 filed Oct. 21, 1969, entitled, "Lead Peroxide-Sulfuric Acid Cell"; Ser. No. 884,051 filed Dec. 10, 1969, entitled, "Spacer for Lead Sulfuric Acid Storage Batteries"; Ser. No. 886,415 filed Dec. 18, 1969, entitled, "Electrolyte for Lead Acid Storage Batteries", and Ser. No. 10,875 filed Feb. 12, 1970, entitled, "Positive Electrode for Lead Acid Storage Batteries". The invention of this application also is related to that disclosed in my U.S. Letters Pat. No. 3,486,940 issued on Dec. 30, 1969, entitled, "Storage Battery Having a Positive Electrode Comprising a Supporting Base of Titanium Nitride Having a Surface Film of Nonpolarizing Material.".

In my copending application Ser. No. 800,078 I describe an electric current producing cell, such as a lead acid storage battery, having a positive electrode comprising a goldplated titanium nitride plate having supporting perforations filled with a mixture of lead oxides and colloidal lead. The electrolyte used is immobilized by the addition of submicron size "fumed" silica.

In my copending application Ser. No. 868,133 I describe a lead peroxide-sulfuric acid cell in which the positive electrode utilizes a base of expanded titanium sheet which has been nitrided, thereafter coated with a thin gold film produced by electrodeposition and impregnated with a composition formed from lead oxides, lead and phosphoric acid, and thereafter wetted with sulfuric acid. As mentioned, in some applications an unnitrided titanium base may be used, but a nonpolarizing layer, such as a thin gold film, is still required to be interposed between the titanium base and the lead peroxide.

In my copending application Ser. No. 884,051, filed Dec. 10, 1969, I describe a spacer for lead peroxide-sulfuric acid type batteries comprising the laminated combination of an acid insoluble microporous spacer such as a sheet of "Synpor" (a microporous polyvinyl chloride) and a sheet of resin-treated absorbent cellulose.

In my copending application Ser. No. 886,415, filed Dec. 18, 1969, I describe a battery in which the electrolyte is sulfuric acid containing a small amount of basic titanyl sulfate, the positive electrode comprising titanium having a thin coating of gold or lead to prevent anodic polarization and a coating thereover comprising a mixture of PbO, Pb and $Pb_3O_4$.

In my copending application Ser. No. 10,875, filed Feb. 12, 1970, I describe a positive electrode for lead acid storage batteries comprising a grid formed from pressed sintered titanium nitride powder having a plurality of apertures or pockets filled with a lead oxide base plate composition containing sulfuric acid. A nonpolarizing layer, such as an extremely thin film of gold, is applied to the grid prior to filling the apertures with the oxide paste.

In my U.S. Letters Pat. No. 3,486,940 I describe a lead peroxide-sulfuric acid storage battery in which the positive electrode utilizes a grid of nitrided expanded titanium metal impregnated with a mixture of lead oxide and lead and having a thin, nonpolarizing coating interposed between the titanium nitride grid and the oxide composition.

In the preparation of the positive electrode of this invention, the titanium-molybdenum-zirconium alloy sheet may be expanded into a honeycomb type of plate with the spaces, so provided, filled with lead oxide, such as red lead, which is applied as a paste with water and a weak acid. Prior to the application of the paste, the titanium alloy is coated with a thin film of a nonpolarizing material, preferably vapor-deposited gold. While other materials may be used, such as a vapor lead deposit or carburizing by heating to 1,000° C. in an acetylene or other hydrocarbon atmosphere, I have found the application of a gold film is the preferred method of preventing interfacial electrolytic polarizing between the lead peroxide and the titanium alloy. For each 20 grams of oxide, 3 cc. of water and 1 cc. of 1,400 sp.g. sulfuric acid is ground to a paste and applied to the expanded plate. The plate is allowed to dry for 20 hours, dipped in sulfuric acid of 1,400 sp.g. and when the initial reaction ceases, it is drained and allowed to react and dry to a hard mass for 48 hours. It is then converted to lead peroxide by anodizing in an electrolyte composed of 1,070 sp.g. If desirable, prior to expanding and before application of the nonpolarizing film, the titanium alloy may be nitrided in the manner set forth in my prior patent and patent applications referred to above. After full conversion to lead peroxide, the plate is placed into a sleeve composed of polyethylene treated cellulose which serves as the spacer.

The negative electrode may be copper sheet of 10 mils thickness which has been expanded to the same pattern as the positive electrode base, then bright-dipped and electroplated with a pore-free lead deposit obtained by the use of a lead fluoroborate electrolyte. The expanded lead-plated copper plate is coated with the same lead oxide mixture utilized for the positive plate and, when the cathode, reduces to lead in 1,070 sp.g. sulfuric acid.

When both plates are formed, the positive electrode having microporous spacers on each side, is assembled with the lead-coated copper electrodes and two polyethylene or styrene plates are placed on each side of the assembly with rubber bands on each end to maintain contact. Where the charging voltage is controlled, the unit is wrapped with two turns of thin Saran plastic and immersed and encapsulated in an epoxy resin. When the epoxy hardens, a completely sealed unit is obtained.

To obtain the maximum life and minimum local attack on the titanium alloy, a sulfuric acid titanium titanyl sulfate electrolyte is used. This is made by saturating 1,300 sp.g. sulfuric acid with titanium titanyl sulfate. Twenty grams of $TiOSO_4$ are added to 600 cc. of 130 sp.g. $H_2SO_4$, the solution being continuously stirred until the 20 grams enter into solution to form an opalescent liquid which is heated to 105° C., with the heat continued until the boiling point of 115° C. is reached. After the solution has cooled, water is added to replace that lost by evaporation, the solution when cooled being clear, with a precipitate on the bottom. It is then passed through a filter and stored for later use. The electrolyte for the battery is made by adding one part of the filtered titanyl solution to five parts of 1,300 sp.g. sulfuric acid. Higher concentrations of the titanyl tend to produce colloidal lead in the electrolyte adjacent to the freshly reduced negative electrode. The 5:1 ratio is adequate to prevent titanium dissolving into the sulfuric acid, the titanyl being used where maximum shelf life at elevated temperatures is desired.

Figure 2:
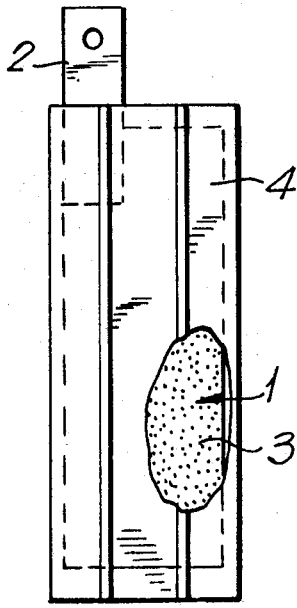

FIG. 1 of the drawing illustrates expanded titanium alloy sheet 1 composed of 80 percent titanium, 15 percent molybdenum and 5 percent zirconium, and having a tab 2 composed of the same alloy welded to the expanded sheet. In FIG. 2 the expanded sheet of FIG. 1 is shown impregnated with lead peroxide 3 sandwiched between minutely porous polyethylene treated cellulose spacers 4.

Figure 3:
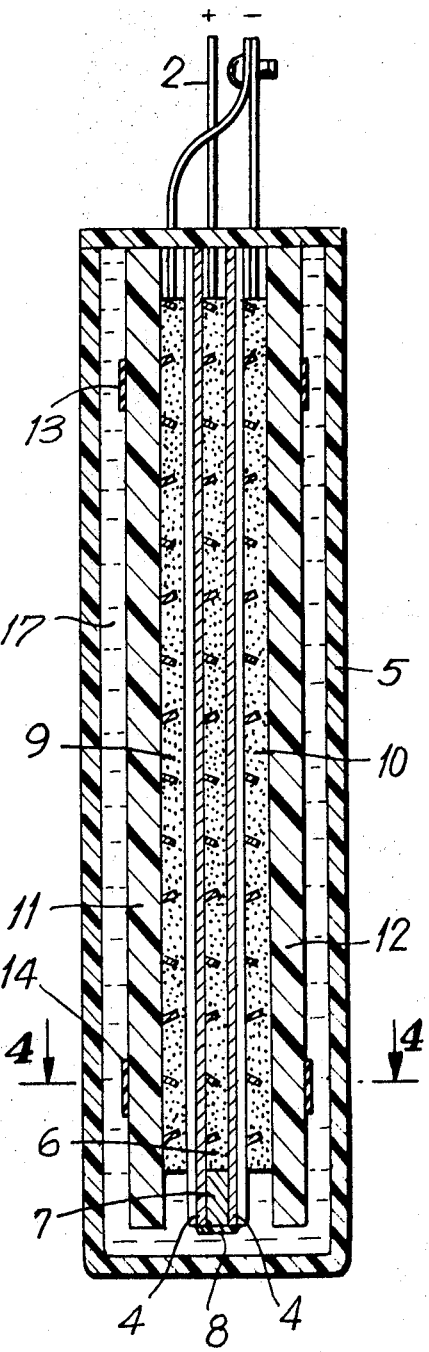
Figure 4:
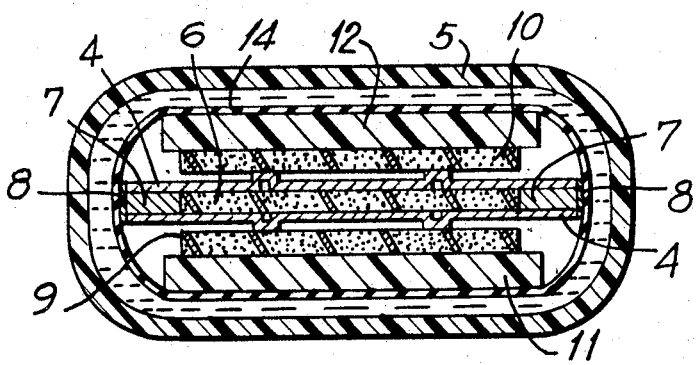

FIGS. 3 and 4 illustrate a battery in which a plastic case 5 houses a cell assembly comprising an oxide impregnated titanium-molybdenum-zirconium positive electrode 6 disposed within an envelope comprising spacers 4, with insulators 7 cemented together by epoxy resin 8. Negative electrodes 9 and 10, in contact with the cemented envelope, comprise lead-coated expanded copper plates. Flat outer plastic plates 11 and 12 are disposed against negative electrodes 9 and 10, the assembly being held together under pressure by rubber bands 13 and 14. The assembled cell is immersed in $H_2SO_4$ electrolyte 17.

Figure 5:
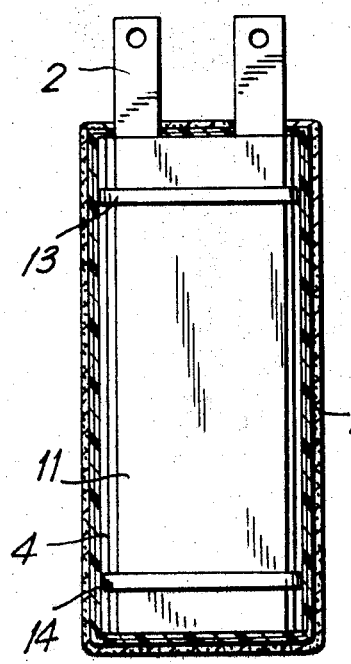

FIG. 5 illustrates a dry type of cell encapsulated in an epoxy mass. In this construction the cell assembly as described in FIG. 3 is immersed in the sulfuric acid electrolyte, drained, wrapped with two turns of thin Saran plastic and encapsulated in epoxy mass 18. Over a period of time the encapsulated units exhibit no deterioration and afford a dry, compact structure.

Units as constructed above have a potential of 2.15 volts when charged and a flash current of approximately 35 amperes for 3 square inches of electrode surface.

The titanium alloy positive electrode of this invention may be used in other types of lead oxide battery structures, such as the tubular type. While a specific alloy composition is mentioned—80 percent titanium, 15 percent molybdenum and 5 percent zirconium—variations in the proportions of these elements are possible, to the extent that they do not substantially detract from the corrosion resistance of the alloy. Generally, a lower limit of 75 percent for the titanium content and a limit of 25 percent for the combined molybdenum and zirconium content, is desirable.

I claim:

1. A storage battery comprising a positive electrode of a beta-type titanium-molybdenum-zirconium alloy grid having a nonpolarizing coating thereover, a lead peroxide layer on said nonpolarizing coating of said grid, an electrolyte of sulfuric acid, and a negative electrode.

2. The storage battery of claim 1 characterized in that the nonpolarizing coating is gold.

3. The storage battery of claim 1 characterized in that the positive electrode grid consists preponderantly of titanium with smaller amounts of molybdenum and zirconium and that the negative electrode comprises lead-coated copper.

4. The storage battery of claim 1 characterized in that the sulfuric acid electrolyte contains a minor amount of basic titanium titanyl sulfate.

5. A storage battery comprising an electrode having a grid of an alloy, said alloy consisting essentially of a minimum of 75 percent titanium by weight of the total composition of said alloy, and molybdenum and zirconium in an aggregate amount of not more than 25 percent by weight of said alloy, a nonpolarizing film on said electrode, a lead oxide coating on said film, said electrode constituting the positive electrode of the battery, an electrolyte of sulfuric acid and a negative electrode.

6. The storage battery of claim 5 above, characterized in that the nonpolarizing film comprises one of the elements gold, lead and carbon.

* * * * *